United States Patent [19]

Hallberg

[11] Patent Number: 4,574,763
[45] Date of Patent: Mar. 11, 1986

[54] DUAL FUEL CARBURETION SYSTEM AND METHOD

[75] Inventor: John E. Hallberg, Peachtree City, Ga.

[73] Assignee: Petrosystems International, Inc., Nashville, Tenn.

[21] Appl. No.: 514,774

[22] PCT Filed: Feb. 18, 1982

[86] PCT No.: PCT/US82/00216
§ 371 Date: Oct. 27, 1982
§ 102(e) Date: Oct. 27, 1982

[51] Int. Cl.[4] .............................................. F02B 43/00
[52] U.S. Cl. ..................................... 123/527; 123/577
[58] Field of Search ...................... 123/527, 525, 575; 48/189.4, 189.5, 184; 261/16, 41

[56] References Cited

U.S. PATENT DOCUMENTS

| | | | |
|---|---|---|---|
| 3,015,548 | 1/1962 | McClain | 48/184 |
| 3,528,787 | 9/1970 | Hallberg | 48/184 |
| 3,741,737 | 6/1973 | Jones | 123/527 |
| 4,020,810 | 5/1977 | Baverstock | 123/527 |

Primary Examiner—E. Rollins Cross
Attorney, Agent, or Firm—L. Lawton Rogers, III

[57] ABSTRACT

A dual fuel system for use with internal combustion engines comprising (a) a manually actuated dual fuel valve, (b) a liquified gas to gaseous fuel converter combining a liquified fuel lock-off valve responsive to engine vacuum and a fuel metering valve responsive to a predetermined positive pressure modulated by engine vacuum, and (c) a positive pressure gaseous fuel and air mixer having a compact plunger structure in which the fuel valve is located within the air valve structure. In one embodiment, the mixer employs a relatively large piston which travels a relatively short distance to meter the flow of air between the lower surface of the piston and a coaxial annular surface. A second embodiment of the mixer utilizes a smaller diameter piston which travels a relatively longer distance, but which utilizes a relatively flat plunger to meter air flow. The fuel valve carried by the plunger structure may be of the needle valve or slotted tube type and may serve as a guide for the air valve structure. Separate air and fuel controls are provided for engine idle, and a portion of the fuel valve structure is replaceable to accommodate gaseous fuels with different physical properties.

42 Claims, 21 Drawing Figures

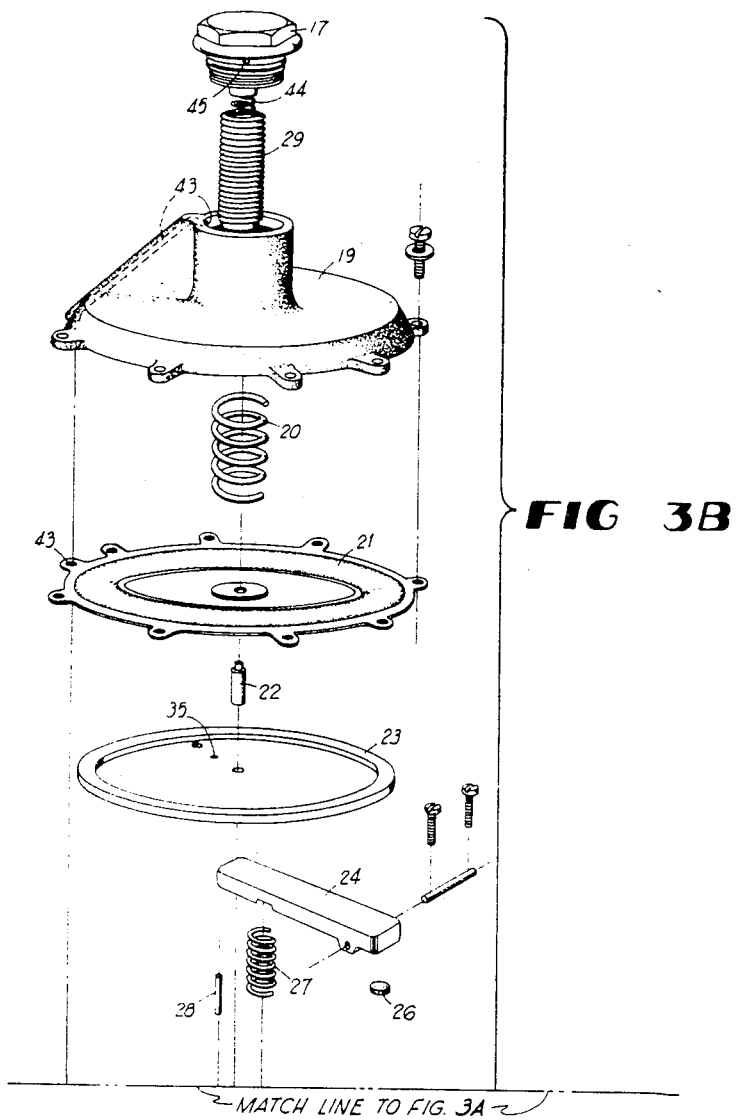

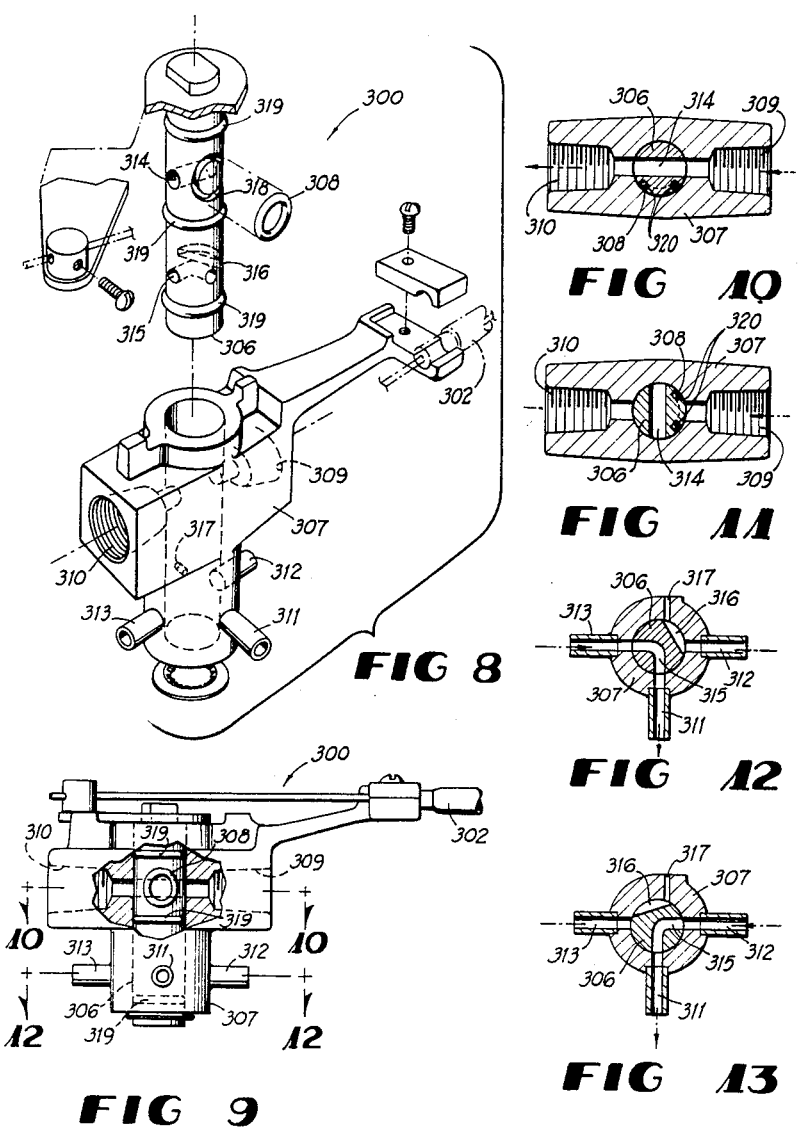

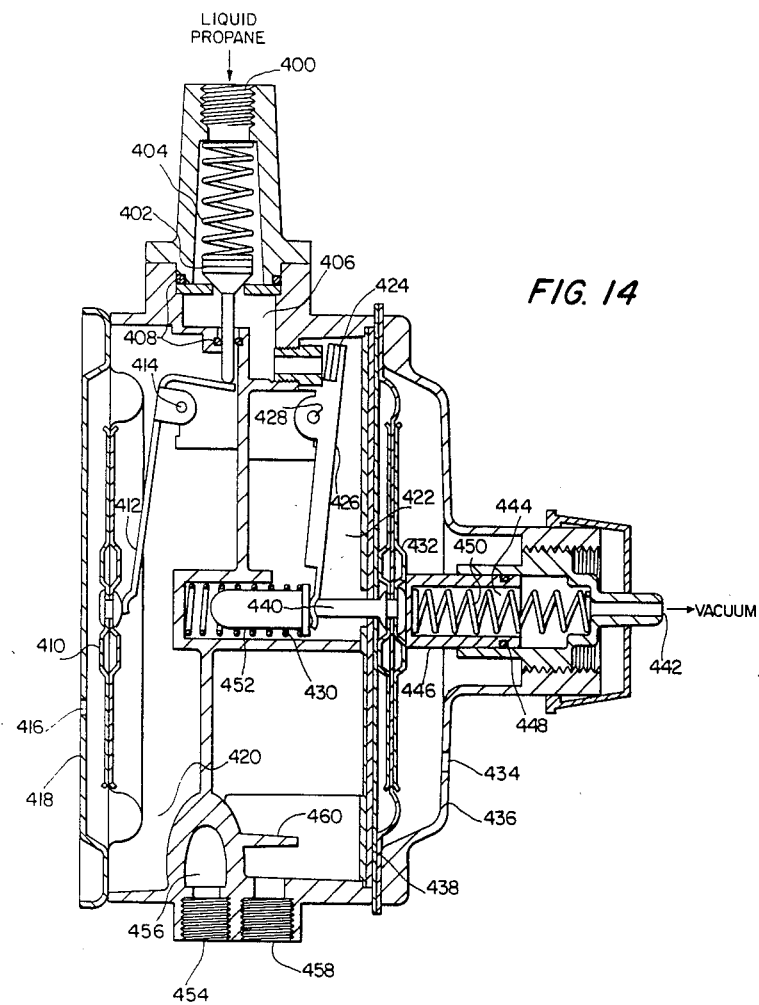

DUAL FUEL CARBURETION SYSTEM AND METHOD

TECHNICAL FIELD OF THE INVENTION

This invention relates to a system for use with a conventional internal combustion engine, such as an automobile engine, to permit alternative utilization of a liquid fuel such as gasoline and a liquified gas fuel such as liquified petroleum gas, natural gas, hydrogen or propane.

BACKGROUND AND ADVANTAGES OF THE INVENTION

Dual fuel systems are well known. Such systems typically consist of a means for selecting the fuel to be utilized, a liquified-to-gaseous fuel converter or vaporizer, and a mixer for gaseous fuel and air.

Typically, such systems utilize electrically operated solenoid valves for the alternative selection of fuels, e.g., one valve in the liquid propane line between the propane storage tank and the inlet to the converter or vaporizer, and another in the gasoline line supplying the carburetor. These solenoid valves are typically activated by a switch mounted for convenient operation by the vehicle driver. However, they frequently do not work well in the environment of the engine, i.e., it is difficult to locate a reliable voltage source in the vehicle's electrical system which is the right voltage, which is available during engine starting and which does not adversely affect the engine ignition system. In addition to the electrical lock-offs for each type of fuel, a vacuum or oil pressure safety switch is generally required. In one aspect, the present invention obviates electrical problems of this type by utilizing a single mechanically operated valve structure with a vacuum lock-off valve in the converter.

Liquified petroleum gas, propane and the other "gaseous" fuels are normally held in a tank under sufficient pressure and at a temperature to remain in a liquid state, and are herein referred to as "liquified gas" fuels. Conversion of such liquified fuel to a gaseous state at a suitable pressure and temperature is accomplished in the converter or vaporizer.

Known converters are generally of the two stage variety. The first stage generally includes a small diameter first stage diaphragm within a chamber warmed by hot engine coolant to actuate a normally open liquified gas inlet valve, and the second stage generally includes a large diameter diaphragm to actuate a normally closed valve responsive to engine demand to supply fuel. However, the converter in some systems (such as disclosed in U.S. Pat. No. 3,528,787 dated Sept. 15, 1970 and assigned to the assignee of this application) utilized a single diaphragm responsive to engine demand but operable at a positive pressure to supply gaseous fuel. Such system continued to use a solenoid operated fuel lock-off valve. In addition, the operating pressure to which such systems were regulated was not variable in response to engine demand.

In another aspect, the converter of the present invention provides a positive "lock off" of gaseous fuel to the converter, combines the two valve functions in a single structure and utilizes two diaphragms of equal size thereby realizing ecomony of manufacture and increased interchangeability of parts. In addition, the utilization of a large fuel inlet valve diaphragm results in very quick starting capability because relatively little drop in intake manifold pressure is required to activate the inlet valve. This reduces the problems common with the low engine starting speeds and the resultant small drop in manifold pressure normally experienced during cold weather conditions.

In another aspect, the converter of the present invention modulates the positive pressure at which gaseous fuel is applied to the mixer as a function of engine demand. A simple mechanical adjustment of the modulator then provides a power adjustment for different fuels.

In the "gasoline" mode, the converter vacuum line is opened to the atmosphere and the consequent absence of pressure differential on the liquified fuel inlet diaphragm of the converter effects a positive lock-off of the liquified fuel inlet valve permitting the conventional carburetor to function in a normal fashion, i.e. with air passing through the air filter and mixer into the carburetor.

In the "liquified gas" mode, the gasoline valve is "off" and engine vacuum is connected to the converter. When the engine is turned over or "cranked", engine vacuum reduces the pressure on one side of the liquified fuel inlet valve diaphragm to permit liquified fuel to enter a fuel passage in the converter. The liquified fuel is admitted responsively to engine demand through a second valve into a gaseous fuel chamber where it expands to a gas, normally regulated to 11 inches w.c. but modulated by engine vacuum.

Fuel economy is enhanced in the present invention by elevation of the temperature of the liquified gas to encourage vaporization in the gaseous fuel chamber where fins are warmed by heat from engine coolant piped through the body of the converter. At higher speed operation, the elevation in temperature is less due to the reduced time of passage of the fuel through the converter. Thus, the engine will benificially run slightly richer at high speeds. Conversely, greater elevation in the temperature of the fuel is achieved during cruise conditions, thereby increasing its volume and resulting in a leaner fuel mixture. The temperature of the gas exiting known prior art converters generally does not vary significantly as a function of engine speed, although this feature may be found to some limited extent in the Hallberg patent referenced above.

Additionally, engine vacuum may be used to modulate the response of the second diaphragm to fuel chamber pressure. For example, engine vacuum during cruise condtions, which is between 7 inches h.g. and 20 inches h.g., may be used to reduce the pressure in the gaseous fuel chamber from approximately 11 inches w.c. to approximately 8 inches w.c. to insure an economically lean fuel mixture during cruise conditions.

Early mixers consisted of a tube in the existing gasoline carburetor at a point where the venturi narrows. However a venturi is not very effective as a metering device when air flow is low and/or slow and typically has a narrow control range unsuitable for both low speed and high speed engine requirements. Subsequent mixer designs have utilized a tapered plug device in the opening of the carburetor, with the plug moving up and down in response to variations in air flow. Such "variable venturi" or "air valve" carburetors have not generally been satisfactory due to hysteresis, i.e., weight of the plug, and the short distance of plug travel, i.e., typically approximately 15.9 mm.

Improved mixer structures such as disclosed in the Hallberg U.S. Pat. No. 3,528,787 employ a plunger structure comprising a large piston responsive to venturi vacuum, a small piston which variably obstructs air flow, and a needle positionable in a fuel orifice on the opposite side of the air passage from the large piston. However, such systems have a relatively large mass and generally exhibit hysteresis problems and relatively poor fuel economy.

In other systems, a diaphragm responsive to engine vacuum is used to meter fuel. However, the movement of the diaphragm is relatively small, and it is difficult to maintain adequate lock-off pressure and acceptable control with movement over such a small distance, thereby necessitating great manufacturing precision.

In another aspect, the present invention provides a more compact mixer with reduced hysteresis by locating the fuel valve within the air valve structure. In one embodiment, the plunger structure includes a relatively large round piston which provides a larger effective surface area than a diaphragm of the same diameter because the ratio of piston surface areas subjected to pressure differentials is greater than the same ratio on similar diaphragm type mixers. In a second embodiment, the plunger structure includes a smaller round piston with a reduced mass generally flat bladed portion as the air valve. In both embodiments, the piston is actuated by the venturi vacuum which results from air flow, and the fuel valve (either needle valve or slotted tube) is located within the air valve structure. Actuation of the piston in response to venturi vacuum opens the fuel valve to supply a fuel and air mixture to the engine through the conventional carburetor and results in stable piston positions and uniform fuel flow at various engine speeds.

The location of the fuel valve within the air valve structure permits the use of a very long needle or slotted tube and thus enhances fuel control. In addition, the fuel transfer tube may be utilized as a guide for the plunger/piston structure, obviating the need for a separate guide within the cylinder in which the piston travels and reducing valve wear problems. This also facilitates the use of labyrinth seals on the piston. The effect of hysteresis is also substantially lessened and may become negligable by comparison to the relatively long piston travel.

In one embodiment of the mixer, air flow is regulated by the distance between one face of a large round piston and an annular surface coaxial with the piston. Since the area of the "cross section" of the air passage in this embodiment is effectively the product of the diameter of the annular surface multiplied by the distance of the piston from the surface, a relatively large volume of air is admitted for a given increment of piston travel, and total piston travel can be relatively short resulting in a compact mixer.

The use of a generally flat air valve plunger structure has been found advantageous because the ratio, of air control surface area to the surface area of the piston rendered ineffective by the presence of the plunger, is greater than is possible with a round plunger. The ratio of the cross-section area of the air passage to the area on the face of the piston diameter is relatively large, thus permitting a compact mixer.

In another aspect of the invention, the use of a positive pressure eliminates the need for mechanical or electrical priming and represents a significant advantage, particularly at low temperatures.

THE DRAWINGS

FIGS. 3A and 3B are an exploded perspective view of one embodiment of the converter assembly;

FIG. 8 is an exploded perspective view of the fluid dual valve assembly;

FIG. 9 is a side elevational view of the valve assembly FIG. 8 with a portion of the valve body cut away;

FIG. 10 is a cross-sectional view taken along lines 10—10 of FIG. 9 with the valve in the "gasoline on," position;

FIG. 11 is a cross-sectional view similar to FIG. 10 with the valve spool rotated 90 degrees to the, "propane on," position;

FIG. 12 is a cross-sectional view taken along lines 12—12 of FIG. 9 with the valve in the "gasoline on," position;

FIG. 13 is a cross-sectional view similar to FIG. 12 wth the valve spool rotated 90 degrees to the "propane on," position.

FIG. 14 is a side elevational view in partial cross-section of a second embodiment of the converter assembly;

BEST MODE FOR CARRYING OUT THE INVENTION

Figure 1:
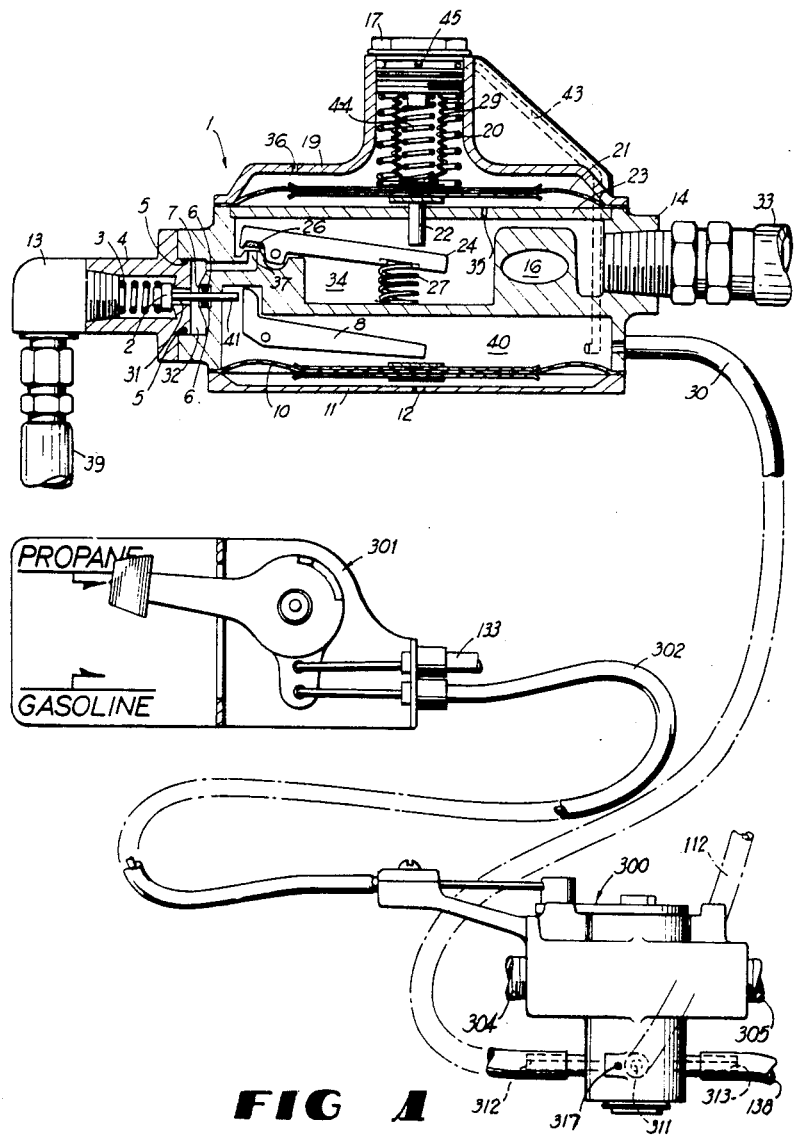
FIG. 1 is a side elevational partial cross-section of one embodiment of the converter assembly with schematized fluid dual valve and valve control means.

Referring to FIGS. 1 and 8–12, the fuel to be utilized (hereinafter assumed to be propane) is selected by positioning the dual fluid valve control 301 in either the "gasoline" or "propane" position. In the "gasoline" mode the control 301 acts through control cable 302 to rotate spool 306 within valve body 307 such that converter vacuum line 30 shown in FIG. 1 is open to the atmosphere through the first vacuum outlet port 312, notch 316 in spool 306 and vent 317 (see FIG. 12). Simultaneously, gasoline from gasoline supply line 304 is supplied to the carburetor 110 through engine gasoline line 305, and tunnel 314 (see FIG. 10) connecting liquid inlet opening 309 and liquid outlet opening 310. In this mode, the carburetor functions normally.

Liquid inlet diaphragm 10 converter 1 is peripherally clamped between converter body 14 and converter base plate 11 such that the top side of diaphragm 10 is exposed to the pressure condition within converter vacuum line 30, which is atmospheric pressure during "gasoline" mode operation. The bottom side of diaphragm 10 is subjected to external atmospheric pressure at all times via converter base plate bleed 12.

Plunger-type liquified fuel inlet valve 2 is biased, by spring 3 such that the inlet valve 2 is closed when the pressure on opposite sides of diaphragm 10 is equal.

Leakage of pressurized propane from supply 39 through inlet valve fitting 13 and into converter 1 is prevented by O-ring 5 which creates a seal between liquid inlet body 4 and converter body 14. Sealing around valve shaft 41 is provided by O-ring 6 which is held in place by a retainer 7. Valve 2 and the related structures thus provide a "lock-off" of liquified gaseous fuel supplied to the converter 1, i.e., the valve 2 will remain closed even if vacuum line 30 is broken or diaphragm 10 ruptured.

In the "propane" mode, spool 306 is rotated such that O-ring 308 on the face of spool 306 forms a seal around liquid inlet opening 309, thereby prohibiting the flow of gasoline. Referring to FIG. 8, O-ring 308 may be seated in a slot 318 milled into the face of spool 306. The walls of slot 318 are substantially parallel to the radius of the spool 306 at each incrememtal segment of the slot. Thus, as may be observed in FIGS. 10, and 11, opposing segment of the inner slot wall 320 proximate the greatest arc of the spool 306 oppose each other at an acute angle, as do the elements of the letter "V", and thereby capture the O-ring 308 and hold it in place in slot 318. O-rings 319, seated in circumferential slots (not shown) in spool 306, provide seals to the atmosphere and provide bearing surfaces which separate spool 306 from valve body 307.

Figure 2:
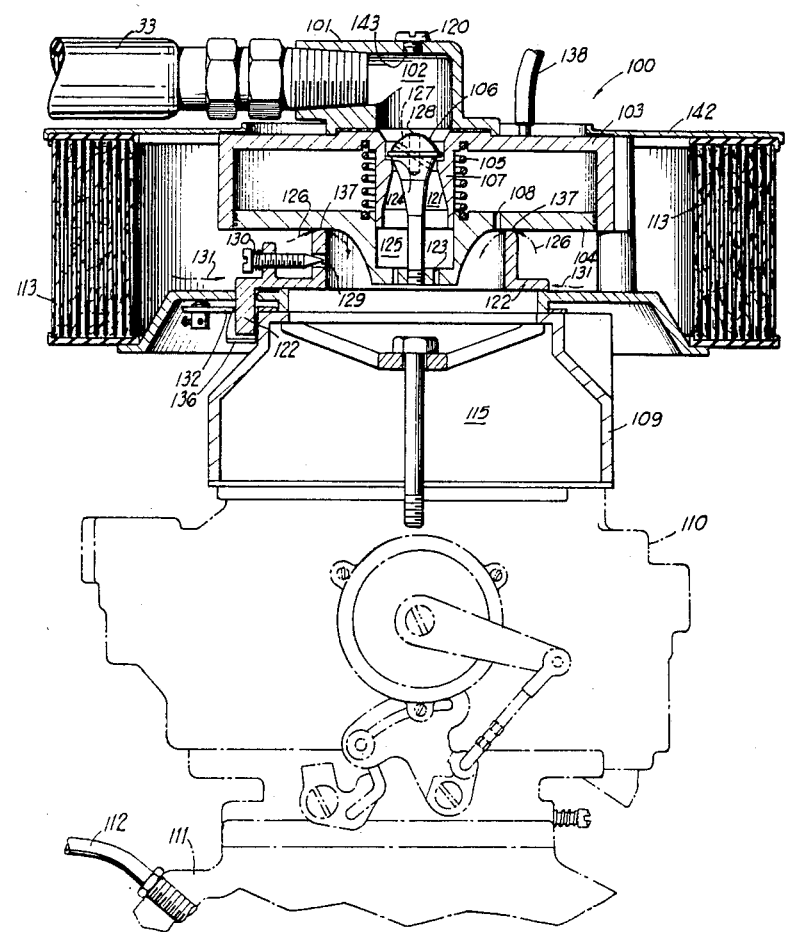
FIG. 2 is a side elevational cross-section of a first embodiment of the mixer assembly.

In addition, duct 315 is aligned to communicate with vacuum inlet port 311 and first vacuum outlet port 312 (FIG. 13), thereby connecting converter vacuum line 30 through outlet port 312, inlet port 311, and intake manifold line 112 to engine intake manifold 111 shown in FIG. 2.

It has been found desirable to construct the valve out of a plastic material so that no artificial lubricants are required and valve wear is diminished.

When the engine is started, intake manifold starting vacuum is communicated to pressure chamber 40 in converter 1 shown in FIG. 1 through lines 112 and 30 and valve 300 to reduce pressure on the upper side of the diaphragm 10. Atmospheric pressure on the lower side of diaphragm 10 urges diaphragm 10 upward against lever 8, the opposite end of which drives shaft 41 against spring 3 to open valve 2 and permit liquified gaseous fuel to flow through orifice 31 into passage 32.

Pressure on the top side of main diaphragm 21 from a yieldable means, such as main diaphragm spring 20 and bellows 29, urges the diaphragm 21 against stem 22 to actuate fuel lever 24. Once actuated lever 24 lifts fuel outlet cover 26, typically rubber compound, to permit flow of fuel into gaseous fuel chamber 34. As pressure within gaseous fuel chamber 34 increases, the bias of spring 20 and bellows 29 is overcome and main diaphragm 21 moves upward permitting cover 26 to seat on outlet 37 and stop the flow of fuel into fuel chamber 34.

As the mixer 100 admits pressurized gaseous fuel to the engine through fuel line 33, the pressure within chamber 34 is reduced and this reduction in pressure is communicated to the lower side of diaphragm 21 through opening 35 in guide plate 23. Consequently, diaphragm 21 is urged downward by atmospheric pressure through orifice 36 in converter top 19 and by the force exerted by diaphragm spring 20 and optional bellows 29 to again move stem 22 against lever 24 to permit flow of the additional fuel into chamber 34. Stem 22, which acts as a valve actuator, is guided by guide plate 23 and contacts but is not connected to lever 24 so that no force in addition to that exerted by spring 27 is exerted on lever 24 when diaphragm 21 moves upwardly beyond the point at which cover 26 is fully seated. This prevents un-desirable pressure on and compression of cover 26. Rotation of plate 23 within body 14 may be prevented by pin 28 (FIG. 3B).

The pressure of fuel within chamber 34 is normally regulated to a pressure of approximately 11 inches w.c., achieved by selection of spring 20, bellows 29 and bellows spring 44.

Figure 3A:
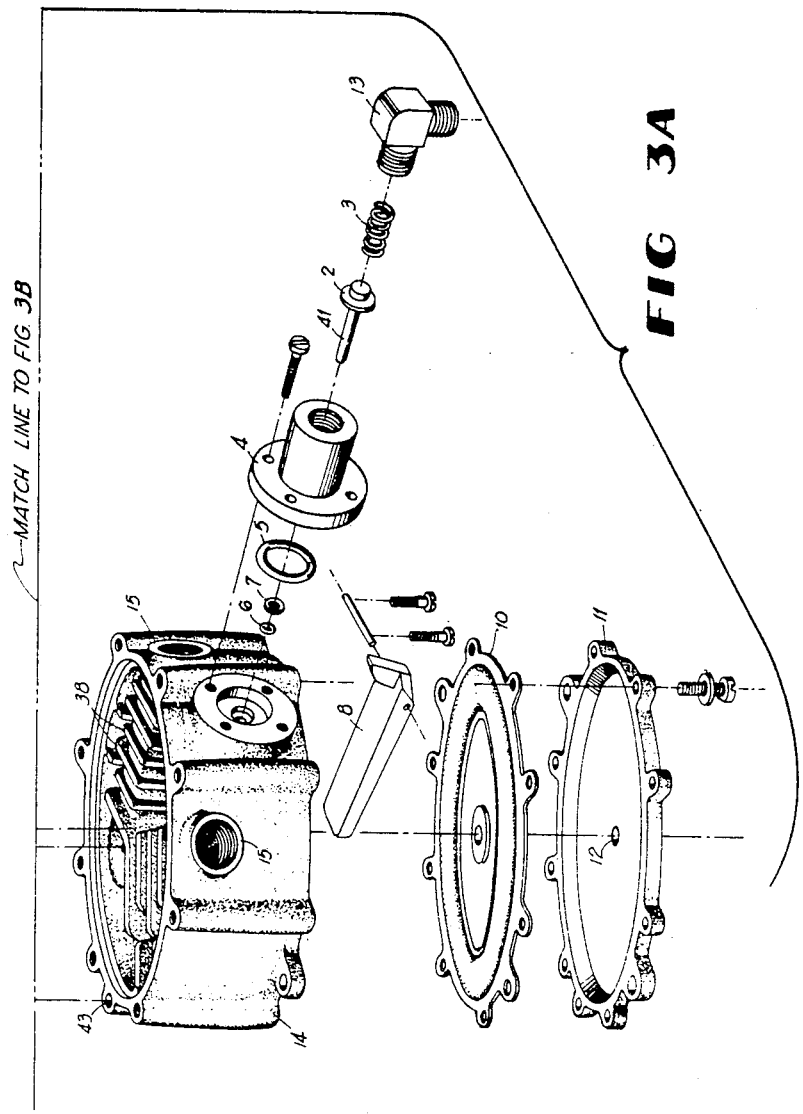

Fuel flowing into chamber 34 is warmed by heat from engine coolant circulated via inlet 15 through passage 16 provided wth fins 38 visible in FIG. 3A. Elevation of the temperature of the fuel is achieved primarily during cruise and medium speed operation of the engine because, at higher engine speeds, fuel passes through the converter so quickly that the temperature thereof is not significantly affected. The engine thus runs slightly richer at wide open throttle since more fuel is contained in a given volume of fuel at lower gaseous fuel temperatures. Conversely, during cruise conditions, a lesser quantity of fuel is contained in a given volume of gaseous fuel as a result of elevation of the gaseous fuel temperature within converter 1, and a relatively leaner fuel mixture results.

Additionally, a bellows 29, (FIGS. 1 and 3B) communicating with chamber 40 through a duct 43 and passages 45 in converter cap 17. The bellows 29 is located inside spring 20 and is biased against diaphragm 21 by a spring 44. Thus, during cruise conditions when the engine intake manifold pressure is between 7 inches h.g. and 20 inches h.g., bellows 29 contracts responsively to reduced intake manifold pressure to decrease the pressure on diaphragm 21 and reduce the pressure level maintained in chamber 34 from the normal 11 inches w.c. to approximately 8 inches w.c. This pressure reduction further reduces fuel flow to the mixer 100 during cruise conditions, thereby automatically providing for a leaner and more economical fuel mixture.

Figure 4:
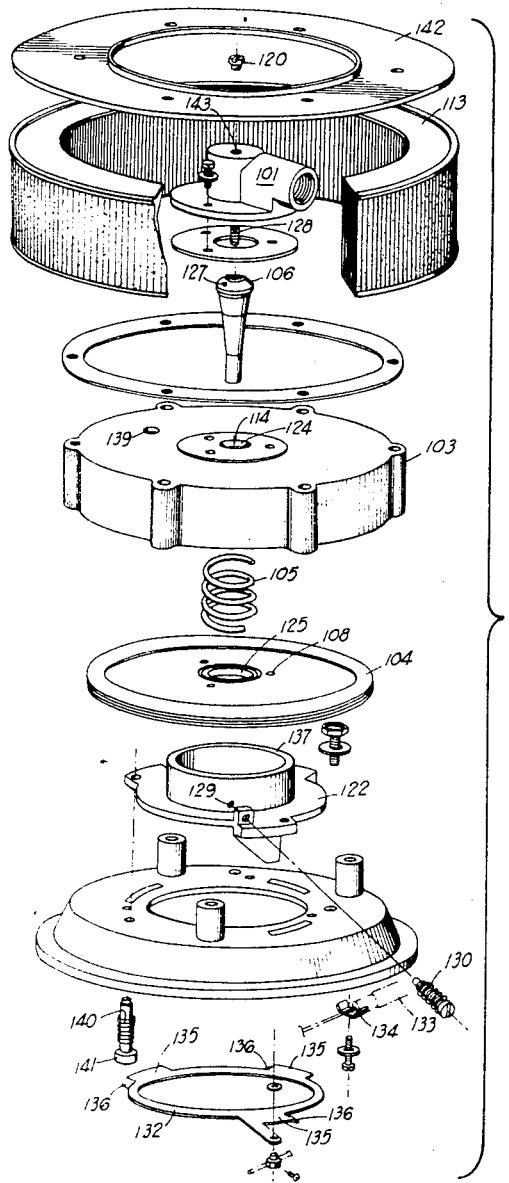
FIG. 4 is an exploded perspective view of the mixer embodiment of FIG. 2.

FIGS. 2 and 4 show an alternative embodiment of the mixer 100 which includes (a) body structure including fuel inlet elbow 101, pressurized gaseous fuel passage 102, and cylinder 103 and (b) a piston 104. Attached to piston 104 is needle 106 which cooperates with an orifice 114 to form a valve to control passage of pressurized gaseous fuel into mixing chamber 115. Needle 106 may be removably attached to piston 104 by threading, press fitting or other conventional mounting means to permit interchangeable use of needles having different tapers appropriate for use with different gaseous fuels. Generally, a steeper needle taper is required for use with a fuel having a relatively smaller energy content and therefore requiring a higher fuel-to-air ratio for proper combustion.

Operation of mixer 100 may be understood by reference to FIGS. 2 and 4. In the "propane" mode, engine starting venturi vacuum is complicated to mixing chamber 115 through conventional carburetor 110 and the adapter 109. The reduction of pressure within mixing chamber 115 is also communicated to the upper side of piston 104 via orifices 108. The portion of the lower side of piston 104 which is disposed radially outward of annular surface 137 on piston lifter 122 is subjected to atmospheric pressure through air filter 113 which urges the piston upward against the resistance of springs 105. Upward movement of piston 104 is guided by sliding contact between fuel transfer tube 107 and piston cavity 125 and lifts needle 106 from orifice 114, thereby permitting gaseous fuel to flow through orifice 114, passage 121, piston cavity 125 and fuel ports 123 (FIG. 2) into mixing chamber 115. Additionally, atmospheric air flows through the air filter 113 and, as indicated by arrows 126, into mixing chamber 115 through the gap between piston 104 and piston lifter 122 when piston 104 is lifted. Thus, gaseous fuel and atmospheric air mix within mixing chamber 115 as both are drawn into conventional carburetor 110.

The flow of pressurized gaseous fuel and atmospheric air into mixing chamber 115 increases the pressure within carburetor 109, which increase is communicated to the top side of piston 104 via orifices 108. Resulting equalization of pressure on both sides of piston 104 permits spring 105 to urge piston 104 downward, thereby reducing the flow of fuel and air into mixing chamber 115 which tends toward an equilibrium condition at each engine speed.

Provision is also made for a separately controlled supply of air (adjustable orifice 129 in piston lifter 122) and fuel (variably obstructed tunnel 127 in needle 106) to mixing chamber 115 at engine idle speeds while piston 104 remains in its downmost position. Improved control of air and fuel during idle is thus achieved without materially affecting fuel and air supply at higher engine speeds.

In the "gasoline" mode, venturi vacuum communicated to the top side of piston 104 causes the piston 104 to be raised and air flows between the bottom side of piston 104 and piston lifter 122 as indicated by arrows 126 into carburetor 110 through mixing chamber 115.

More fuel efficient operation may be achieved by providing optional means for mechanically lifting piston 104 when the "gasoline" mode is selected. Such lifting may be accomplished by lifter actuator 132 which is slightly rotated about its vertical axis by control 301, which actuates valve 300. Such rotation results in sliding movement of lifter actuator arms 135 against camming surfaces 136 on piston lifter 122, thereby urging piston lifter 122 upward against the resistance of springs 140 (FIG. 4) to permit air to pass under piston lifter 122 into carburetor 110. Upon reverse rotation of lifter actuator 132 in response to movement of control 301, piston lifter 122 is pulled down to its normal seated position by springs 140. A bell crank (not shown) or other means to reverse cable movement, or alternatively to rotate lifter actuator 132 in the opposite direction from that achieved by connection as shown in FIG. 4, may be required.

Another means for providing air to the carburetor 110 during operation in the "gasoline" mode may be achieved by providing communication between the top side of piston 104 and a vacuum source to reduce the pressure on the top side of piston 104 and move piston 104 upward. For example, duct 315 in spool 306 communicates between vacuum inlet port 311 and second vacuum outlet port 313 (FIG. 13) to apply engine intake manifold vacuum to the top side of piston 104 through vacuum line 138.

Figure 5:
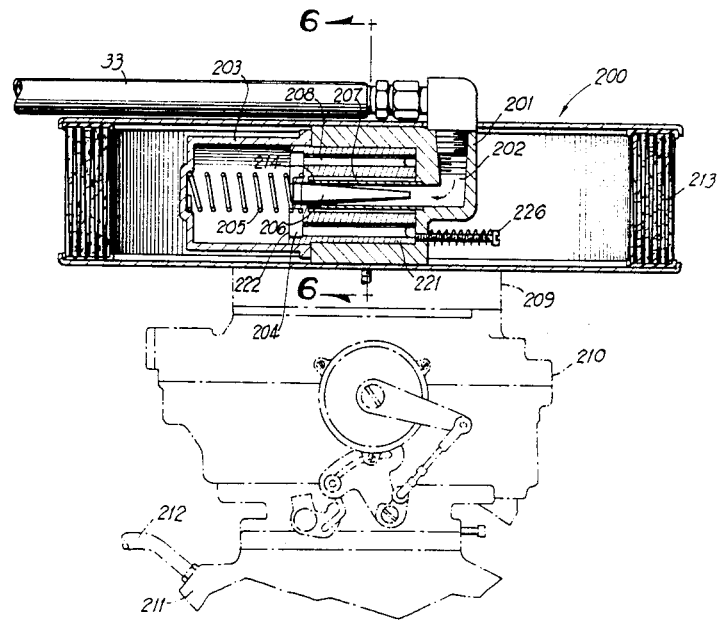
FIG. 5 is a side elevational view in partial cross-section of a second embodiment of the mixer assembly.
Figure 6:
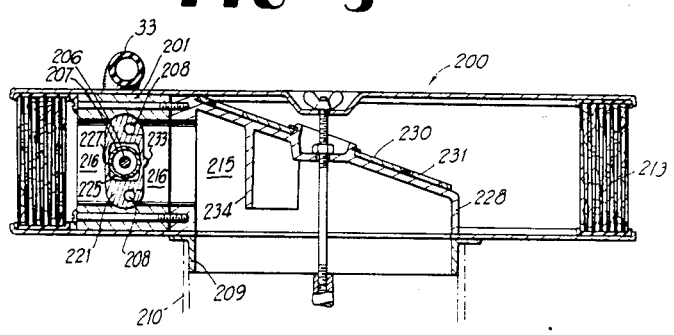
FIG. 6 is a section taken along the lines 6—6 in FIG. 5.
Figure 7:
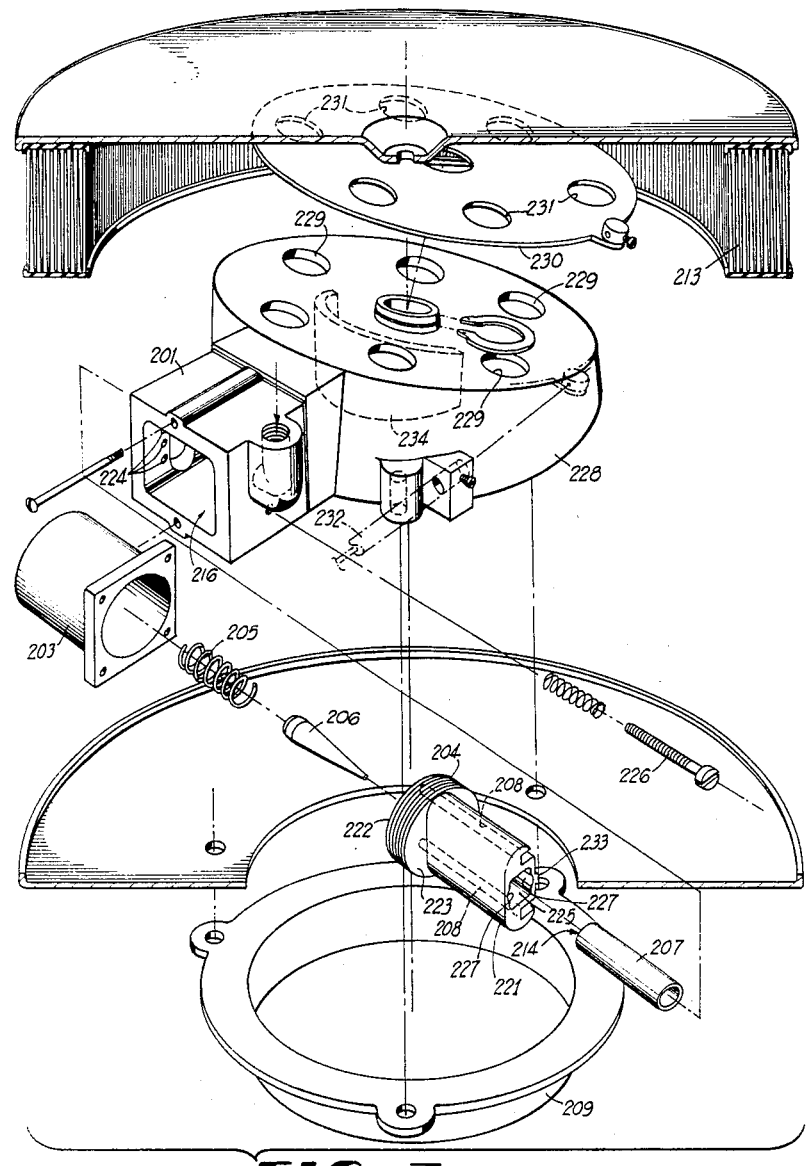
FIG. 7 is an exploded perspective view of the mixer assembly of FIG. 5.

In the embodiment shown in FIGS. 5, 6 and 7 mixer 200 includes (a) body structure comprising cylinder 203 and body 201 and fuel transfer tube 207, which together form a pressurized gaseous fuel passage 202; and (b) a plunger structure comprising a piston 204 and piston actuator 221 of substantially oval cross section. Mixer body 201 also forms an air passage 216 (FIGS. 6 and 7) into which piston actuator 221 projects with the greater oval axis of the cross section of piston actuator 221 oriented transverse to air passage 216. Movement of the plunger structure comprising piston actuator 221 and piston 204 is guided by sliding contact between fuel transfer tube 207 and acuate sliding surfaces 227 in cavity 225. Attached to piston 204 is a removable needle 206, which moves within orifice 214 to control passage of fuel into mixing chamber 215.

In the "propane" mode, engine starting venturi vacuum is communicated to mixing chamber 215 and the downstream side of air passage 216 through carburetor 210 and adaptor 209. This vacuum is also communicated to the back side 222 of piston 204 through orifices 208. Atmospheric pressure acting on the front side 223 of piston 204 through air filter 213 and holes 224 (FIG. 7) urges piston 204 against spring 205 and the reduced pressure induced by the vacuum. Movement of piston 204 moves piston actuator 221 and needle 206. Movement of needle 206 away from orifice 214 permits gaseous propane within passage 202 to flow into through cavity 225 and air passage 216 into mixing chamber 215. Venturi vacuum also draws air through air filter 213 and air passage 216 past piston actuator 221 and into mixing chamber 215. Thus, fuel and air mix within mixing chamber 215 as both are drawn into carburetor 210. Baffle 234 attached to housing 228 serves to induce turbulence and thus enhance mixing.

The flow of pressurized gaseous fuel and atmospheric air into body 201 increases the gaseous pressure within the body. This increase in pressure is communicated to the back side 222 of piston 204 through orifices 208 and the resulting equalization in pressure permits spring 205 to urge piston 204 and the structures attached thereto toward body 201 to reduce the flow of propane between orifice 214 and needle 206. Movement of actuator 221 projecting into body 201 also reduces the flow of air through body 201. This reduction in air and fuel flow tends toward an equilibrium condition at each engine speed.

Provision is made for controlled supply of air and fuel to the engine at engine idle speeds by screw 226 which passes through body 201 and contracts the end of actuator 221, thereby limiting its travel to provide a minimum passage for air through air passage 216 and to maintain a passage for gaseous propane between orifice 214 and needle 206. Idle adjustments may then be made separately from an adjustment of the response characteristics of the metering valves.

In the "gasoline" mode, venturi vacuum communicated to the back side 222 of piston 204 results in withdrawal of piston actuator 221 from air passage 216, thereby permitting an increased flow of air. More fuel efficient operation may be achieved by provision of an optional air bypass valve. As shown in FIG. 7, an optional air valve may include openings 229 in housing 228 which align with openings 231 in plate 230 rotated by a control cable 232 responsively to control 301.

Inadvertent incorrect orientation of the plunger structure during assembly or reassembly after servicing may be prevented by providing piston actuator 221 with an irregular cross sectional shape, as for instance, by the provision of ridge 233 so that piston actuator 221 will be received in mixer body 201 only in the correct orientation.

An alternative embodiment of the converter of the present invention is illustrated in FIG. 14. With reference to FIG. 14, liquid propane is conveyed to an orifice 400 from the tubing 39 of FIG. 1. A plunger type valve 402 biased to the "closed" position by a spring 404 prevents the entrance of the liquid propane into the passageway 406. Leakage is prevented by O-ring seals 408. Thus the spring 404 provides a positive lock-off for the valve 402.

The valve 402 is actuated by way of a diaphragm 410 acting through a lever 412 pivotable about point 414 to move the valve 402 against the bias of spring 404 and to thus admit liquid propane into passageway 406. Diaphragm 410 on the left-hand side of FIG. 14 is subjected to atmospheric pressure through aperture 416 in cover plate 418 on one side, and to engine vacuum applied to the cavity 420 from a suitable vacuum line (not shown). Thus, it is only when the engine is started and the vacuum lines are intact to the cavity 420 that a pressure differential exist with respect to the diaphragm 410 and the positive liquid propane lock-off valve 402 can be opened.

A second valve controls the passage of liquid propane from the cavity 406 into the fuel expansion chamber 408. This valve 424 may be of any suitable conventional type but is desirably maintained in the "closed" position by the seating of a suitable resilient material on an orifice in response to the counterclockwise pivoting of valve actuator 426 about point 428 in response to the bias of a spring 430. The characteristics of the spring 430 are selected to overcome the positive pressure of the liquid propane within the passageway 406. The control over movement of the actuator 440 is increased by the use of a cylinder 452 within the spring 430.

The actuator of the valve 424 is controlled by the movement of a diaphragm 432 on the right-hand side of FIGS. 14. The diaphragm 432 is responsive on the righthand side to atmospheric pressure supplied through an aperture 434 in the housing 436. The pressure on the left-hand side of the diaphragm 432 is that of the chamber 424 communicated through the apertures in plate 438 surrounding the plunger 440 attached to the actuator 426.

As earlier explained in connection with FIG. 1, a negative pressure differential between the positive pressure in chamber 422 and atmospheric pressure must be sufficient to move the diaphragm 432 to the left against spring 430 and the pressure of the liquid propane in passageway 406 to open the valve 424 to admit additional liquid propane into the expansion chamber 422. Thus, the reduction in pressure created by engine operation reduces the pressure within the expansion chamber 422 as the gaseous fuel is passed to the mixer and permits the valve 444 to operate to admit additional liquid propane to chamber 422.

As explained earlier, the predetermined pressure within chamber 422 is a function of engine demand, i.e., the pressure reduction created by the flow of gaseous propane from the chamber 422 into the engine carburetor. This predetermined pressure may optionally be modulated by the application of engine vacuum through an aperture 442 to a cylinder 444 in which a piston 446 slides. O-rings 448 are provided to effect a seal between the atmospheric pressure on the right-hand side of the diaphragm 432 and the cylinder 444. The piston 446 may be biased into the extreme left-hand position by means of a spring 450. Thus, the bias of the spring 450 must be overcome by the engine vacuum applied through aperture 442 to effect a reduction in the operating pressure of the chamber 422.

With continued reference to FIG. 14, a drain plug may be utilized in threaded aperture 454 to drain the engine coolant passageway 456. A similar plug 458 may be utilized as an oil drain and as an aperture through which the pressure in the cavity 422 may be measured. While only one of the fins 460 such as illustrated in FIG. 3A are shown, such fins may be utilized to increase the heat transfer from the engine coolant in the passageway 456 to the propane within the cavity 422.

Figure 16:
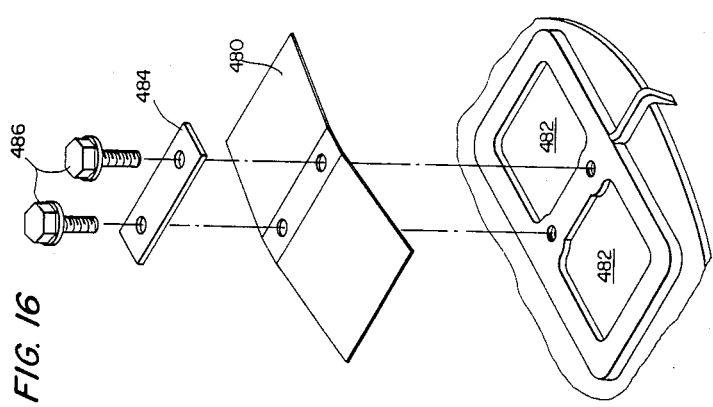
FIG. 16 is an exploded perspective view of the "backfire" outlet of the mixer of FIG. 15.
Figure 17:
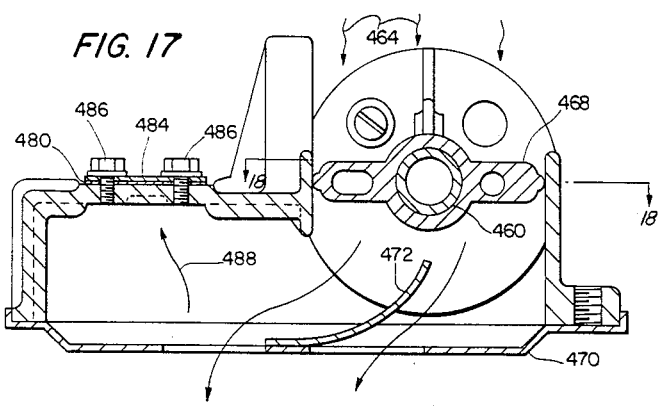
FIG. 17 is a section taken along lines 17—17 of FIG. 16.
Figure 18:
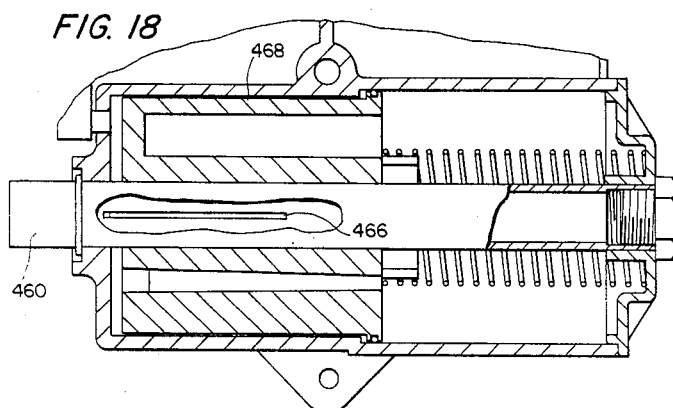
FIG. 18 is a section taken along lines 18—18 of FIG. 17.

A third embodiment of the mixer of the present invention is illustrated in FIGS. 15-18. With reference to FIGS. 15-18, a gaseous fuel tube 460 is disposed across a generally rectangular passageway 462 through which air flows into the carburetor in the direction shown by arrows 464 in FIG. 17. This fuel tube 460 may have a single longitudinal aperture 466 as illustrated in FIG. 18, which aperture may be at a constant width or may be made to vary depending upon the metering characteristics desired and the energy content of the fuel. The tube may be removable to facilitate conversion to a different type of liquified fuel.

The tube 460 serves as a guide on which the generally flat bladed piston 468 slides to variably obstruct the passage of air through the aperture 462 into the carburetor, the operation of the piston being substantially the same as that explained in connection with the embodiment of FIGS. 5-7.

It has been found desirable to equip the bottom plate 470 of the mixer with a baffle 472 to divert a portion of the mixture of air and gaseous fuel to the left as shown in FIG. 17. This diversion, together with the increased turbulence created by the use of the baffle, enhances the mixing of the air and gaseous fuel and enhances combustion.

Figure 19:
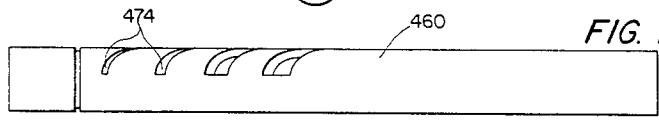
FIG. 19 is a side elevational view of a second embodiment of the fuel tube shown in FIG. 18.
Figure 20:
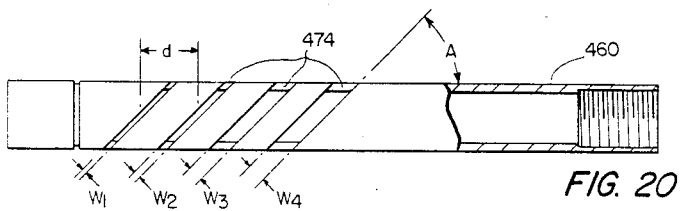
FIG. 20 is a top plan view of the fuel tube of FIG. 19.

As an alternative to the longitudinally slotted fuel tube 460 of FIG. 18, the fuel tube may be of the type illustrated in FIGS. 19 and 20 wherein the tube is provided with a series of diagonal slots 474. Preferably, the slots 474 are disposed at an angle A to the longitudinal axis of the tube such that the right-hand end of one slot terminates at the point where the left-hand end of the immediately adjacent slot begins, thus insuring continuity of the fuel aperture exposed as the piston 468 slides on the fuel tube 460. It has also been found preferable to change the diameter of the slots progressively with engine speed. In the configuration illustrated in FIGS. 19 and 20, for example, it has been found convenient to utilize a mean distance d between slots of 0.575 inches, an angle A of 40 degrees and slot widths W1-W4 progressively of about 0.055, 0.062, 0.156 and 0.187 inches.

Figure 15:
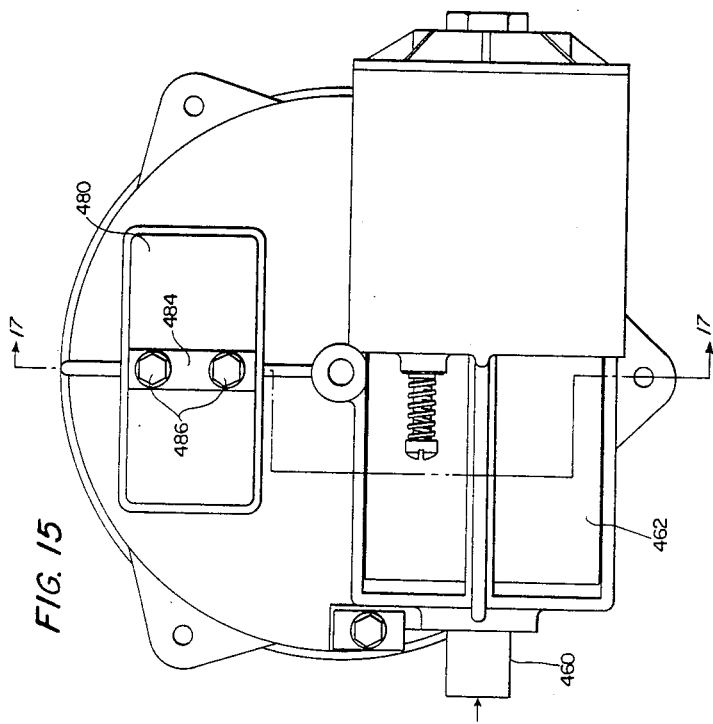
FIG. 15 is a top plan view of a third embodiment of the mixer assembly.

With reference to FIGS. 15-17, backfire protection is provided by means of a flat spring 480 held in place over a pair of apertures 482 in the top of the mixer housing. The flat spring 480 may be centrally mounted by means of a flat plate 484 and suitably threaded fasteners 486. In the event of a backfire from the engine, the excessive pressure may be relieved as illustrated by the arrow 488 in FIG. 17 through the apertures 482 by the upward flexing of the outer ends of the flat spring 480.

Although the present invention is described and illustrated above with detailed reference to the foregoing embodiments, the invention is to be limited only by the language of the following claims when accorded a full range of equivalents.

I claim:

1. Apparatus for mixing air with a gaseous fuel for application to a combustion chamber comprising:
   a mixing chamber having an air passageway adapted for fluid communication with a source of air, a fuel inlet aperture adapted for fluid communication with a source of a gaseous fuel, and an outlet aperture adapted for fluid communication with a combustion chamber;
   air valve means for restricting the passage of air from said air passageway to said chamber outlet aperture responsively to engine venturi vacuum, said air valve means including a piston slidable in a cylinder and having an axial passage in fluid communication with said fuel inlet aperture; and
   fuel valve means located within said axial passage for restricting the passage of gaseous fuel from said fuel inlet aperture to said chamber outlet aperture responsively to movement of said air valve means.

2. The apparatus of claim 1 wherein said fuel valve means includes a variable diameter needle movable within an orifice in said axial passage, the movement of said needle relative to said orifice being responsive to movement of said piston in said cylinder.

3. The apparatus of claim 2 wherein said needle is removable whereby the metering of said fuel valve may be adapted for different fuels.

4. The apparatus of claim 1 wherein said fuel valve means includes a tube in fluid communication with said fuel inlet aperture, said tube having a throughwall slot exposed by movement of said piston in said cylinder.

5. The apparatus of claim 4 wherein said throughwall slot is a longitudinal slot of variable width.

6. The apparatus of claim 4 wherein said throughwall slot is a plurality of generally parallel slots disposed at an acute angle to the axis of said tube, the width of at least some of said slots differing from the width of others of said slots.

7. The apparatus of claim 4 wherein said tube is removable whereby the metering of said fuel valve may be adapted for different fuels.

8. The apparatus of claim 1 wherein the direction of movement of said piston in said cylinder is normal to the flow of air through said air valve means.

9. The apparatus of claim 8 wherein said piston includes a flat bladed extension apertured to receive said fuel valve means.

10. The apparatus of claim 9 wherein the diameter of said piston is substantially equal to the width of said air passageway.

11. The apparatus of claim 1 wherein said piston includes a flat bladed extension apertured to receive said fuel valve means.

12. The apparatus of claim 11 wherein the diameter of said piston is substantially equal to the width of said air passageway.

13. The apparatus of claim 11 wherein said piston is supported within said cylinder by said fuel valve means.

14. The apparatus of claim 11 wherein said fuel valve means includes a variable diameter needle movable within an orifice in said axial passage, the movement of said needle relative to said orifice being responsive to movement of said piston in said cylinder.

15. The apparatus of claim 11 wherein said fuel valve means includes a tube in fluid communication with said fuel inlet aperture, said tube having a throughwall slot.

16. The apparatus of claim 1 wherein said piston is provided with labyrinth seals.

17. The apparatus of claim 1 wherein said piston is supported within said cylinder by said fuel valve means.

18. The apparatus of claim 1 including means for adjusting the idle position of said fuel valve means without adjusting the response characteristics thereof.

19. Apparatus for mixing air with a gaseous fuel for application to the carburetor of an internal combustion engine comprising:
   a mixing chamber having a generally rectangular air inlet passageway in fluid communication with a source of air, a fuel inlet tube adapted for fluid communication with a source of a gaseous fuel, and an outlet passageway adapted for fluid communication with a combustion chamber; and
   valve means for restricting the passage of air through said air inlet passageway to said outlet passageway and for restricting the passage of gaseous fuel from said fuel inlet tube to said outlet aperture,
   said valve means including a piston slidable within a chamber and having a generally flat bladed projection, the axis of said cylinder being normal to said air inlet passageway and said chamber being disposed relative to said air inlet passageway so that said flat bladed projection variably restricts the flow of air through said air inlet passageway responsively to the position of said piston in said cylinder,
   said fuel inlet tube supporting said piston within said cylinder and being apertured to variably restrict the passage of fuel into said air inlet passageway responsively to the position of said piston within said chamber and thus to the position of said projection in said air inlet passageway.

20. The apparatus of claim 19 including means for positioning said piston within said chamber is responsive to the flow of air through said air inlet passageway.

21. The apparatus of claim 20 wherein said cylinder is closed on one end; and
   wherein said piston positioning means included means for biasing said piston toward the open end of said cylinder; and
   means for sensing the venturi vacuum of the carburetor and applying said vacuum to said cylinder on the closed end side of said piston to oppose said biasing means.

22. The apparatus of claim 21 wherein the said fuel inlet tube comprises a tube having a plurality of generally parallel throughwall slots of differing width disposed at an acute angle to the axis of said fuel inlet tube.

23. The apparatus of claim 19 wherein the said fuel inlet tube comprises a tube having a plurality of generally parallel throughwall slots of differing width disposed at an acute angle to the axis of said fuel inlet tube.

24. A method of mixing air with a gaseous fuel for application to a combustion chamber comprising the steps of:
   (a) providing a mixing chamber having a first inlet passageway in fluid communication with a source of a gaseous fuel, and an outlet aperture in fluid communication with a combustion chamber;
   (b) controlling the passage of air through the first inlet aperture to the outlet aperture responsively to carburetor venturi vacuum by a piston slidable in a cylinder having an axial passage; and
   (c) controlling the passage of gaseous fuel from the second inlet aperture to the outlet aperture through the axial passage responsively to the passage of air through the first aperture to the outlet aperture.

25. A duel fuel system for an internal combustion engine comprising:
- a converter for converting liquified fuel to a gaseous fuel, said converter having a gaseous fuel chamber with a liquified fuel inlet aperture, an engine vacuum inlet aperture and an outlet aperture adapted for communication with the carburetor of an internal combustion engine, said converter being operable responsively to engine manifold vacuum and to the pressure within said fuel chamber to pass gaseous fuel from said inlet aperture to said outlet aperture under a positive pressure;
- a mixer for mixing air with a gaseous fuel for application to a combustion chamber, said mixer having a mixing chamber with an air inlet passageway adapted for fluid communication with a source of air, a gaseous fuel inlet aperture in fluid communication with the outlet aperture of said converter, an outlet aperture adapted for fluid communication with the carburetor of an internal combustion engine, air valve means for restricting the passage of air from said air inlet aperture to said outlet aperture responsively to engine venturi vacuum, and fuel valve means for restricting the passage of gaseous fuel from said fuel inlet aperture to said outlet aperture responsively to movement of said air valve means; and
- a manually operable valve adapted for fluid communication with a source of liquified gas, a source of gasoline, atmospheric pressure and engine manifold vacuum, said valve being operative in a first position to pass gasoline to the carburetor of the internal combustion engine and being operative in a second position to pass liquified gas to the inlet aperture of said converter, and to apply engine vacuum to the engine vacuum inlet aperture of said converter.

26. The system of claim 25 wherein the response of said second valve means to the pressure within said fuel chamber is modulated as a direct function of engine manifold vacuum.

27. The system of claim 25 including means for adjusting the idle position of said mixer without adjusting the response characteristics thereof to engine demand.

28. The system of claim 25 including valve means in response to engine manifold vacuum operative to block the passage of fuel into said fuel chamber and to block the passage of fuel from said fuel chamber to said mixer.

29. The system of claim 25 wherein said air valve means includes a piston slidable in a cylinder and having an axial passage; and
- wherein said fuel valve means is located within said axial passage.

30. The system of claim 29 wherein said fuel valve means includes a tube having a throughwall slot exposed by movement of said piston in said cylinder.

31. The system of claim 25 wherein said air valve means includes a cylinder having a flat bladed extension, said extension apertured to receive a portion of said fuel valve means.

32. The system of claim 25 wherein said mixer includes:
- a mixing chamber having a generally rectangular air inlet passageway in fluid communication with a source of air, a fuel inlet tube adapted for fluid communication with a source of a gaseous fuel, and an outlet passageway adapted for fluid communication with a combustion chamber; and
- valve means for restricting the passage of air through said air inlet passageway to said outlet passageway and for restricting the passage of gaseous fuel from said fuel inlet tube to said outlet aperture.
- said valve means including a piston slidable within a chamber and having a generally flat bladed projection, the axis of said cylinder being normal to said air inlet passageway and said chamber being disposed relative to said air inlet passageway so that said flat bladed projection variably restricts the flow of air through said air inlet passageway responsively to the position of said piston in said cylinder,
- said fuel inlet tube supporting said piston within said cylinder and being apertured to variably restrict the passage of fuel into said air inlet passageway responsively to the position of said piston within said chamber and thus to the position of said projection in said air inlet passageway.

33. The system of claim 32 wherein said converter comprises:
- a gaseous fuel chamber having an inlet aperture adapted for communications with a source of liquified gas, an outlet aperture adapted for communications with the carburetor of an internal combustion engine, and a plurality of internal partitions defining a convoluted passageway between said inlet and outlet apertures;
  - first valve means being operable responsively to engine manifold vacuum to pass liquified gas from said inlet aperture to said second valve means, and
- second valve means being operable responsively to the pressure within said fuel chamber to pass liquified gas to said fuel chamber, said second valve means includes a diaphragm the movement of which is responsive to the pressure differential between atmospheric pressure and the pressure within said fuel chamber of less than about one third pounds per square inch;
  - means for modifying the response of said second valve means to the pressure in said fuel chamber in response to engine vacuum, the effects of an increase into engine manifold vacuum being opposed to the effects of an increase in the pressure within said fuel chamber;
- a passageway adapted for fluid communication with a source of engine coolant, the walls of said passageway being is a heat transfer relationship to the partitions in said fuel chamber,
- whereby liquified gas may be passed from said inlet aperture through the heated and convoluted passageway in said fuel chamber for conversion to a gaseous fuel and for subsequent passage through said outlet aperture under a positive pressure to the carburetor of an internal combustion engine.

34. The system of claim 25 wherein said converter comprises:
- a gaseous fuel chamber having an inlet aperture adapted for communications with a source of liquified gas, an outlet aperture adapted for communications with the carburetor of an internal combustion engine, and a plurality of internal partitions defining a convoluted passageway between said inlet and outlet apertures;
  - first valve means being operable responsively to engine manifold vacuum to pass liquified gas from said inlet aperture to said second valve means, and second valve means being operable responsively to the pressure within said fuel chamber to pass liquified gas to said fuel chamber, said second valve means includes a diaphragm the movement of which is responsive to the pressure differential between atmospheric pressure and the pressure within said fuel chamber of less than about one third pounds per square inch;

means for modifying the response of said second valve means to the pressure in said fuel chamber in response to engine vacuum, the effects of an increase into engine manifold vacuum being opposed to the effects of an increase in the pressure within said fuel chamber;

a passageway adapted for fluid communication with a source of engine coolant, the walls of said passageway being is a heat transfer relationship to the partitions in said fuel chamber, whereby liquified gas may be passed from said inlet aperture through the heated and convoluted passageway in said fuel chamber for conversion to a gaseous fuel and for subsequent passage through said outlet aperture under a positive pressure to the carburetor of an internal combustion engine.

35. Apparatus for mixing air with a gaseous fuel for application to a combustion chamber comprising:

a mixing chamber having an air passageway adapted for fluid communication with a source of air, a fuel inlet aperture adapted for fluid communication with a source of a gaseous fuel, and an outlet aperture adapted for fluid communication with a combustion chamber;

air valve means for restricting the passage of air from said air passageway to said chamber outlet aperture responsively to engine venturi vacuum, said air valve means including a piston slidable in a cylinder in a direction normal to the flow of air through said air valve means, and said air valve means having an axial passage in fluid communication with said fuel inlet aperture; and fuel valve means located within said axial passage for restricting the passage of gaseous fuel from said fuel inlet aperture to said chamber outlet aperture responsively to movement of said air valve means, said fuel valve means including a valve element movable within said axial passage responsively to movement of said piston in said cylinder, said valve element being removable whereby the metering of said fuel valve may be adapted for different fuels, said piston being supported within said cylinder by said fuel valve means and including a flat bladed extension apertured to receive said fuel valve means.

36. The apparatus of claim 35 wherein said valve element includes a tube in fluid communication with said fuel inlet aperture, said tube having a throughwall slot exposed by movement of said piston in said cylinder, said tube being removable whereby the metering of said fuel valve may be adapted for different fuels.

37. The apparatus of claim 35 wherein the diameter of said piston is substantially equal to the width of said air passageway and wherein said piston is provided with labyrinth seals.

38. Apparatus for mixing air with a gaseous fuel for application to the carburetor of an internal combustion engine comprising:

a mixing chamber having an air inlet passageway in fluid communication with a source of air, a fuel inlet tube adapted for fluid communication with a source of a gaseous fuel, and an outlet passageway adapted for fluid communication with a combustion chamber; and valve means for restricting the passage of air through said air inlet passageway to said outlet passageway and for restricting the passage of gaseous fuel from said fuel inlet tube to said outlet aperture;

said valve means including a piston slidable within a chamber to variably restrict the flow of air through said air inlet passageway responsively to the position of said piston in said cylinder, said fuel inlet tube supporting said piston within said cylinder and being apertured to variably restrict the passage of fuel into said air inlet passageway responsively to the position of said piston within said chamber.

39. The apparatus of claim 38 wherein said valve means includes means for positioning said piston within said chamber responsively to the flow of air through said air inlet passageway;

wherein said cylinder is closed on one end; and wherein said piston positioning means includes means for biasing said piston toward the open end of said cylinder and for sensing the venturi vacuum of the carburetor and applying said vacuum to said cylinder on the closed end side of said piston to oppose said biasing means.

40. The apparatus of claim 39 wherein the said fuel inlet tube comprises a tube having a plurality of generally parallel throughwall slots of differing width disposed at an acute angle to the axis of said fuel inlet tube.

41. Apparatus for mixing air with a gaseous fuel for application to the carburetor of an internal combustion engine comprising:

a mixing chamber having a generally rectangular air inlet passageway in fluid communication with a source of air, a fuel inlet passageway means adapted for fluid communication with a source of a gaseous fuel, and an outlet passageway adapted for fluid communication with a combustion chamber; and valve means for restricting the passage of air through said air inlet passageway to said outlet passageway and for restricting the passage of gaseous fuel from said fuel inlet tube to said outlet aperture, said valve means including a piston slidable within a chamber and having a generally flat bladed projection, the axis of said cylinder being normal to said air inlet passageway so that said flat bladed projection variably restricts the flow of air through said air inlet passageway responsively to the position of said piston in said cylinder, said piston being supported within said cylinder by said fuel inlet passageway means.

42. The apparatus of claim 41 wherein said valve means includes means for positioning said piston within said chamber responsively to the flow of air through said air inlet passageway;

wherein said cylinder is closed on one end; and wherein said piston positioning means includes means for biasing said piston toward the open end of said cylinder and for sensing the venturi vacuum of the carburetor and applying said vacuum to said cylinder on the closed end side of said piston to oppose said biasing means.

* * * * *